United States Patent [19]

Englehardt

[11] Patent Number: 5,196,682
[45] Date of Patent: Mar. 23, 1993

[54] INFRARED OPTICAL CARD HAVING AN OPAQUE CASE FOR HIDING INTERNAL COMPONENTS

[75] Inventor: Gary A. Englehardt, Manchester, Mass.

[73] Assignee: Wang Laboratories, Inc., Lowell, Mass.

[21] Appl. No.: 363,421

[22] Filed: May 31, 1989

Related U.S. Application Data

[63] Continuation of Ser. No. 880,410, Jun. 30, 1986, abandoned.

[51] Int. Cl.⁵ .............................................. G06K 7/10
[52] U.S. Cl. ..................................... 235/454; 235/491; 250/271
[58] Field of Search ............... 342/42, 44, 51, 53; 364/200; 235/379, 454, 441, 439, 492, 455, 491, 468; 358/194.1; 359/142, 143, 152; 250/271, 340, 341

[56] References Cited

U.S. PATENT DOCUMENTS

| | | | |
|---|---|---|---|
| 3,842,246 | 10/1974 | Kohler et al. | 235/439 |
| 3,858,031 | 12/1984 | Kornfield | 235/454 |
| 3,936,662 | 2/1976 | Rausing | 235/439 |
| 4,066,910 | 1/1978 | Swift | 235/454 |
| 4,239,338 | 12/1980 | Borelli et al. | 350/164 |
| 4,241,456 | 12/1980 | Nakagaki et al. | 358/194.1 |
| 4,454,414 | 6/1984 | Benton | |
| 4,459,474 | 7/1984 | Walton | 235/439 X |
| 4,529,870 | 7/1985 | Chaum | |
| 4,553,267 | 11/1985 | Crimmins | 455/614 |
| 4,600,829 | 7/1986 | Walton | 235/439 |
| 4,605,844 | 8/1986 | Haggan | 235/380 |
| 4,608,486 | 8/1986 | Berstein et al. | 235/380 |
| 4,617,216 | 10/1986 | Haghiri-Tehrani et al. | 235/488 |
| 4,639,606 | 1/1987 | Boles et al. | 235/455 X |
| 4,641,017 | 2/1987 | Lopata | 235/454 X |
| 4,709,137 | 11/1987 | Yoshida | 235/379 |
| 4,742,573 | 5/1988 | Popovic | 235/454 X |

FOREIGN PATENT DOCUMENTS

| | | |
|---|---|---|
| 56056 | 6/1979 | European Pat. Off. |
| 16883 | 6/1986 | European Pat. Off. |
| 3639333 | 6/1987 | Fed. Rep. of Germany |
| 226622 | 10/1975 | France |
| WO8203484 | 10/1982 | Int'l Pat. Institute |
| WO8504035 | 9/1985 | Int'l Pat. Institute |
| 8504035 | 9/1985 | PCT Int'l Appl. |
| 1504196 | 3/1978 | United Kingdom |
| 2143062A | 1/1985 | United Kingdom |
| 2163579A | 2/1986 | United Kingdom |
| 2164814A | 3/1986 | United Kingdom |
| 2185134 | 7/1987 | United Kingdom |

OTHER PUBLICATIONS

Patent Abstracts of Japan, vol., 10, No. 89 (P-444) (2146) Apr. 8, 1986.

Primary Examiner—John Shepperd
Attorney, Agent, or Firm—Michael H. Shanahan; Kenneth L. Milik

[57] ABSTRACT

A portable data storage card is provided for storing and carrying digital data to be accessed or modified at fixed locations. The pocket-sized card has a durable sealed case, devoid of electrical connectors. Data is stored in an internal Electrically Erasable PROM, which includes memory control circuitry. The card is inserted into a reader/programmer at a fixed location and receives power from an inductive source in the reader/programmer by means of an internal coil. Data transfer between the card and the external reader/programmer unit is effected by infrared optoelectronic devices, through the case of the card, which is transmissive to infrared light. The reader/programmer controls a user's access to the data stored on the card, requiring a user to supply a secure identification code to access the stored data. The case is opaque to visible light in order to hide the components from view.

6 Claims, 5 Drawing Sheets

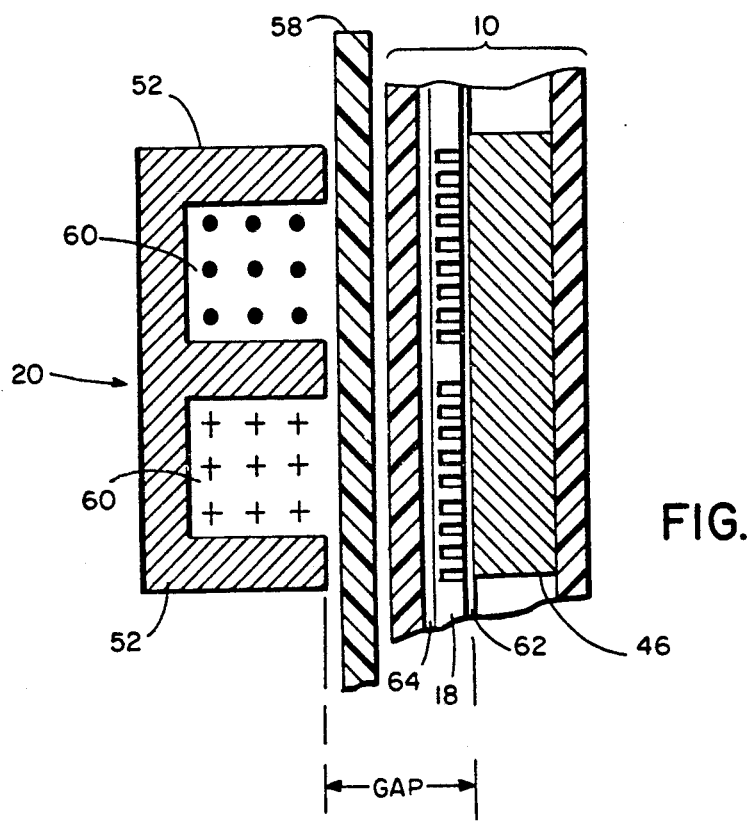
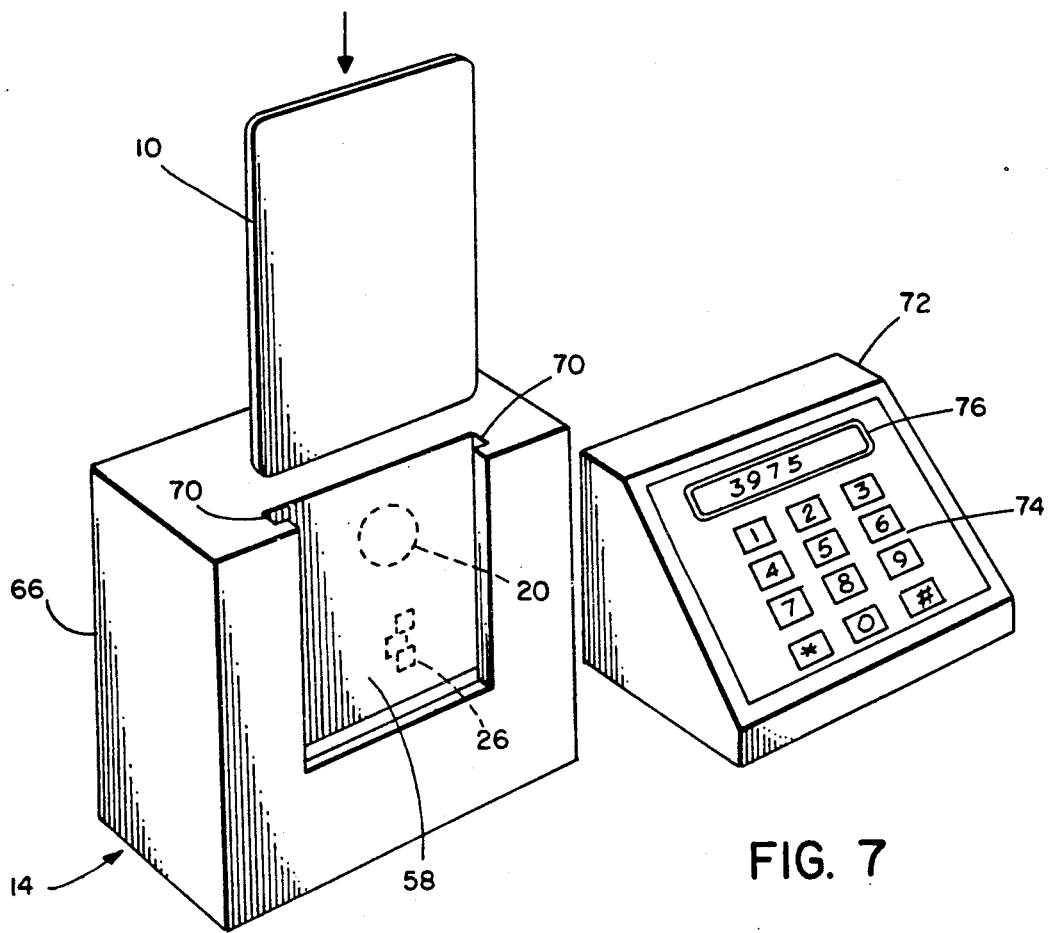
FIG. 6
FIG. 7

INFRARED OPTICAL CARD HAVING AN OPAQUE CASE FOR HIDING INTERNAL COMPONENTS

This is a continuation of co-pending application Ser. No. 06/880,410 filed on Jun. 30, 1986 now abandoned.

FIELD

This invention relates generally to portable card devices for storing data electronically, and more particularly to a data storage card which provides superior usability.

BACKGROUND

The development and use of intelligent credit cards or "smart cards" is well known. These devices are made by encasing one or more microelectronic chips in a plastic carrier the size of a credit card. The card generally includes a non-volatile memory for the storage of binary encoded data, and some cards include a CPU chip for limited processing of that data.

Smart cards are considered to be more secure and versatile than the standard embossed plastic credit cards which employ a magnetic stripe for the storage of data. Smart cards may be used for storing a user's financial records, medical history, or other confidential information, and may also be used as security keys to control access to buildings and facilities. Various password schemes and security algorithms have been devised and programmed into the cards to prevent unauthorized use of the cards or access to the data they contain.

In financial transaction applications, for example, the card might carry information related to user's credit balance. A user, desiring to make a purchase, inserts the card into a reader/programmer until in a fixed location, such as a store. The reader/programmer validates the user's personal access code and then deducts the amount of the transaction from the user's credit balance on the card, while charging the amount of the transaction to the user's account in a central bank computer. Examples of data card systems of this type are disclosed in U.S. Pat. Nos. 3,971,916 and 4,007,355, issued to Moreno Data storage cards such as those discussed above are basically effective, although they suffer from certain disadvantages. Virtually all data cards have an electrical connector which mates with a connector in the reader/programmer unit. The reader/programmer unit supplies the card with power and communicates with the card's internal circuitry through the electrical connector. The electrical connector on the card is subject to wear due to the frictional contact that must be maintained with the connector in the reader/programmer. As the card is used for a period of time, dirt or grit deposits on the connector terminals, making the electrical connections sporadic or ineffective, and rendering the card unusable.

Also, most data cards have a fragile construction, which is inadequate to protect the internal microcircuits during long-term use. Should the data card become exposed to temperature extremes or hostile environments, such as in military use, the data could be damaged or lost. Where a card might contain a patient's vital medical records, such data loss could be catastrophic. Moreover, when the data cards are plugged into or removed from the reader/programmer, electrical sparks can result, which limits their use to environments that are free of flammable or explosive gases.

SUMMARY

In accordance with the present invention, a novel data storage card is provided which is extremely durable and requires no electrical connectors to interface to a reader/programmer unit.

The data storage card of the present invention is housed in a durable sealed case, approximately the size of a standard credit card, made of polysulfone, a durable thermoplastic. The case is waterproof and resistant to temperature extremes and abrasion. Furthermore, the case is devoid of external electrical connectors of any kind, which eliminates wear problems associated with electrical contacts and makes the card sparkproof. In addition, the polysulfone case has very good transmissive properties in the infrared region of the light spectrum.

The data storage card contains a memory consisting of an electrically erasable PROM with a serial interface, for the storage and transfer of data in response to commands from a reader/programmer.

The data storage card of the present invention includes infrared optoelectronic devices, in the form of IR photodiodes and an IR LED, coupled to the memory, for transferring digital data to and from complimentary infrared devices located in the reader/programmer. The infrared optoelectronic devices are located within the case, and the IR data signals are transmitted through the case material.

A secondary coil and switching power supply, within the case and magnetically coupled to an external inductive power source located in the reader/programmer, provides a source of regulated electrical power for use by the memory and infrared optoelectronic devices. The power source in the reader/programmer requires no direct physical contact with the coil and switching power supply located in the data storage card.

The reader/programmer includes a mechanical alignment mechanism to allow easy insertion of the data storage card as well as precise alignment of the coil and IR optoelectronic device in the card with the matching inductive source and IR optoelectronic devices in the reader/programmer. The inductive source consists of a high-frequency power supply coupled to a primary coil, which is aligned with the secondary coil in the data storage card when the card is inserted in the reader/programmer. The IR optoelectronic devices in the reader/programmer consist of IR LEDs and an IR photodiode, which are spectrally matched to those in the data storage card.

The IR optoelectronic devices in the reader/programmer are coupled to an internal microprocessor to provide for programming the data storage card. The reader/programmer also includes an industry standard interface for connecting with a host computer. The host computer provides the applications software for the reader/programmer. The reader/programmer controls a user's access to the data stored in the card by means of secure identification codes.

The present invention can be used in all applications where conventional data cards are used. In addition, the present invention has many uses where conentional data cards are unsuitable, because the card is sealed and devoid of electrical contacts. This feature of durability makes it especially suited for use in hostile environments, where the data contained on the card might otherwise be destroyed, such as in military field operations or in remote locations where no equipment repair facilities are available. Moreover, the data card is tamperproof, sparkproof, and waterproof, making it usable in high temperatures or harsh cold at any humidity level, including total submersion in water. Because the card is sparkproof, the present invention can be used in environments where open electrical connections are dangerous because of the explosive nature of the materials handled in these environments, such as oil refineries, paint solvent companies, or hospitals, where explosive gases such as bottled oxygen are used.

BRIEF DESCRIPTION OF THE DRAWINGS

The foregoing and other objects, features and advantages of the invention will be apparent from the following more particular description of a preferred embodiment of the invention, in conjunction with the accompanying drawings. In the drawing:

FIG. 6 is a cross-sectional view of the magnetic coupling elements of the present invention;

FIG. 7 is a perspective illustration of the data storage card, reader programmer, and keyboard entry device of the present invention.

DESCRIPTION OF THE PREFERRED EMBODIMENT

Figure 1:
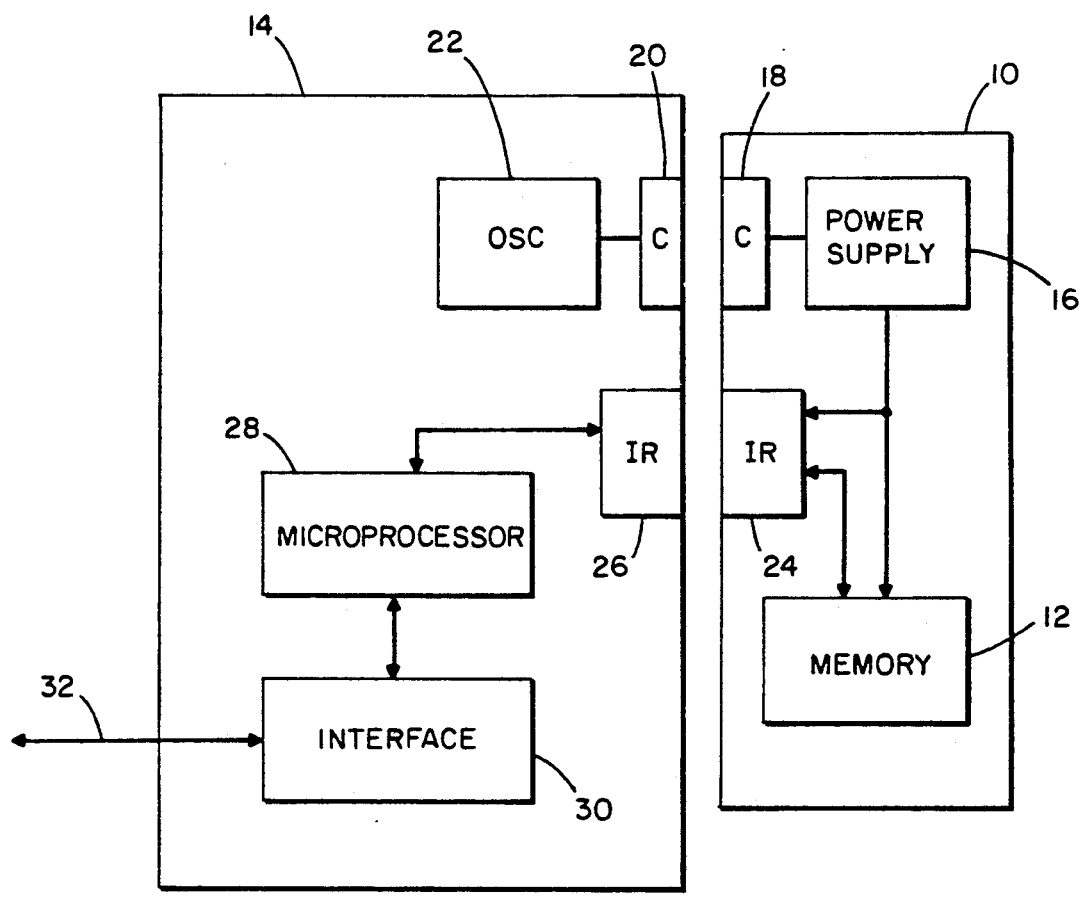
FIG. 1 is a simplified block diagram of the data storage card and reader/programmer of the present invention.

Referring now to FIG. 1, a data storage card is shown in accordance with the present invention, which provides a portable and secure means for storing data. The data storage card, generally referred to as 10, includes a non-volatile, electrically erasable memory 12 for the storage of data.

The data storage card 10 interfaces with a reader/programmer unit 14, for reading and modifying the data carried in memory 12. The power for the card electronics and the actual transmission of data are provided without a direct a physical connection between the circuitry of the data storage card 10 and that of the reader/programmer 14. Power for the data storage card 10 is provided by a high-frequency power supply 16 which has a secondary coil 18 as its input. The reader/programmer 14 has a primary coil 20, which is driven by a high-frequency oscillator 22. When the coils 18 and 20 are properly aligned, and the primary coil 20 is energized by oscillator 22, a current is induced in the secondary coil 18 and a regulated voltage is supplied to all card electronics.

Transfer of data between the data storage card 10 and the reader/programmer 14 is accomplished by infared optoelectronic devices 24 in the data card 10 and infrared optoelectronic devices 26 in the reader/programmer 14, when properly aligned. Infrared devices 24 and 26 also provide for transmitting and receiving a clock signal to the memory 12.

When data storage card 10 is inserted into reader/programmer 14, the coils 18 and 20 and the infrared devices 24 and 26 are automatically aligned for proper functioning.

The reader/programmer contains a microprocessor 28, which initiates data transfers between to and from memory 12, and transfers the data through a standard RS-232 interface 30 to a host computer on data I/O bus 32.

Figure 2:
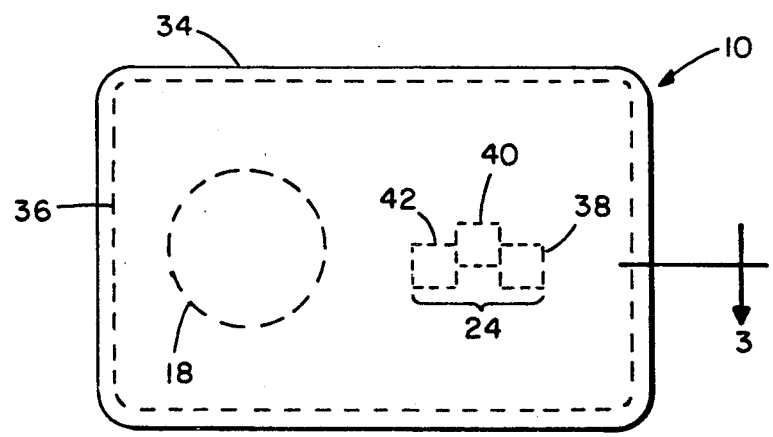
FIG. 2 is a plan view of the data storage card of the present invention, showing some of its major features.

Referring now to FIG. 2, the physical form of the data storage card 10 is shown. The data storage card includes an external case 34, which is completely sealed and devoid of electrical terminals or connectors of any kind. The external case 12 measures approximately 3.38 inches in length and 2.12 inches in width, which conforms to the standard ISO dimensions for financial transaction cards and allows the data storage card 10 to be easily portable in a user's pocket or wallet. The card has a thickness of approximately 0.14 inches, which is somewhat greater than the standard credit-card dimension.

Included within the external case 34 is a printed circuit board 36, which provides a mounting surface for a secondary coil 18, for infrared optoelectronic devices 24—which are actually three separate devices 38, 40, and 42—and for all other board electronics. The secondary coil 18 provides a means for deriving electrical power for its internal logic circuity from the reader/programmer 14, when the card is properly inserted. The IR photodiode 38 is for providing a clock to the internal logic circuity of data storage card 10. The IR photodiode 40 and the IR LED 42 are used for the reception and transmission of digital data between the internal memory 12 of data card 10 and the reader/programmer 14.

Figure 3:
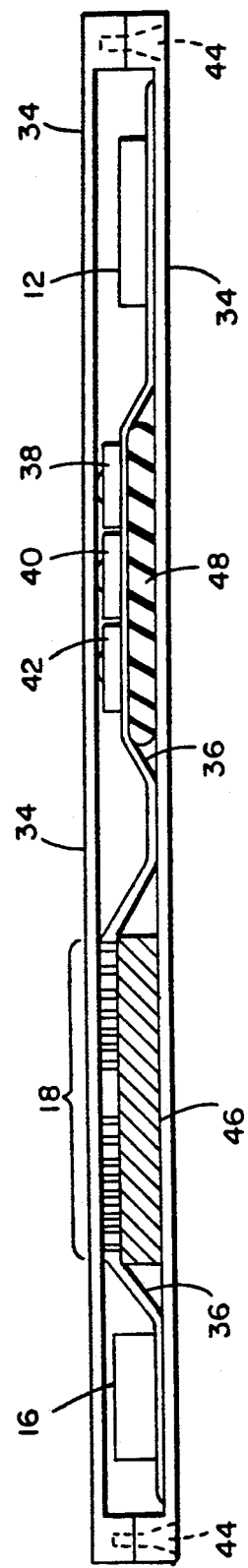
FIG. 3 is a cross-sectional view of the data storage card of the present invention, dimensionally exaggerated for clarity, showing the disposition of internal components.

Turning now to FIG. 3, the internal components of data storage card 10 can be viewed in more detail. The external case 34 is manufactured from polysulfone, a rigid high-strength thermoplastic, to give the data card 10 the properties of rigidity and long-term durability. This case material serves to protect the internal components of data card 10 under conditions of harsh use and in hostile environments. Moreover, polysulfone has transmissive properties which are favorable to the passage of infrared light while effectively screening out all visible light. This property makes it possible to transmit digital signals in the form of infrared pulses, to and from the data card 10, while keeping the optoelectronic devices 38, 40, 42 fully sealed and protected within the external case 34. A suitable polysulfone for this use is UDEL PSF P-1700 Black 1615, available from Union Carbide Corporation of Hackensack, N.J.

The external case 34 may include indicia molding into its surface, such as a name, a company logo, or any other general identification information, in any position other than those occupied by the secondary coil 16 or the infrared optoelectronic devices 38, 40, 22, as indicated in FIG. 1. Such labelling would also serve to aid a user in orienting the data storage card 10 with respect to the reader/programmer 18.

The external case 38 is of a clamshell-type construction having upper and lower halves, as can be best seen by reference to FIG. 3. The two-piece external case 12 is manufactured by standard injection molding techniques and the case halves are joined at their periphery by screws 44. The thickness of the external case 34 is limited to 0.02 inches to ensure proper functioning of the secondary coil 18 and the infrared devices 38, 40, and 42. At the time of manufacture all voids within the external case 34 are filled with a standard silicone adhesive compound, completely sealing the external case 34.

All the internal components of data card 10 are mounted on a non-magnetic printed circuit board 36 made of Kapton, manufactured by 3M-Electronic Products of St. Paul, Minn. Kapton is a flexible printed circuit material, approximately 0.007 inches in thickness, consisting of three layers in its completed form. A base layer has a copper layer laminated to it, having the specification of one half ounce of copper per square foot. Circuit patterns are screened and etched into the copper layer by standard printed circuit board fabrication techniques. A cover layer, prepared with cutouts for the electronic components, is applied over the copper etches with adhesive and laminated to form a one-piece circuit, in which all the thin copper etches are protected by the cover layer. The electronic components are then surface mounted on pads in the etched copper, which extend through cutouts in the cover layer.

The data storage card 10 further includes a secondary coil 18 and a switching power supply 16, which will be discussed in detail in connection with FIG. 5 and 6.

The IR optoelectronic devices 38, 40, and 42 should be the tallest components in the external case 34, so that they touch external case 34 when the clamshell halves are brought together. This will prevent the silicone adhesive from blocking the emitting or detecting surfaces when it is injected into the case 34. To achieve this, a small layer of foam 48 is placed below the printed circuit board 36 during assembly, to raise the height of the devices 38, 40, and 42.

Figure 4:
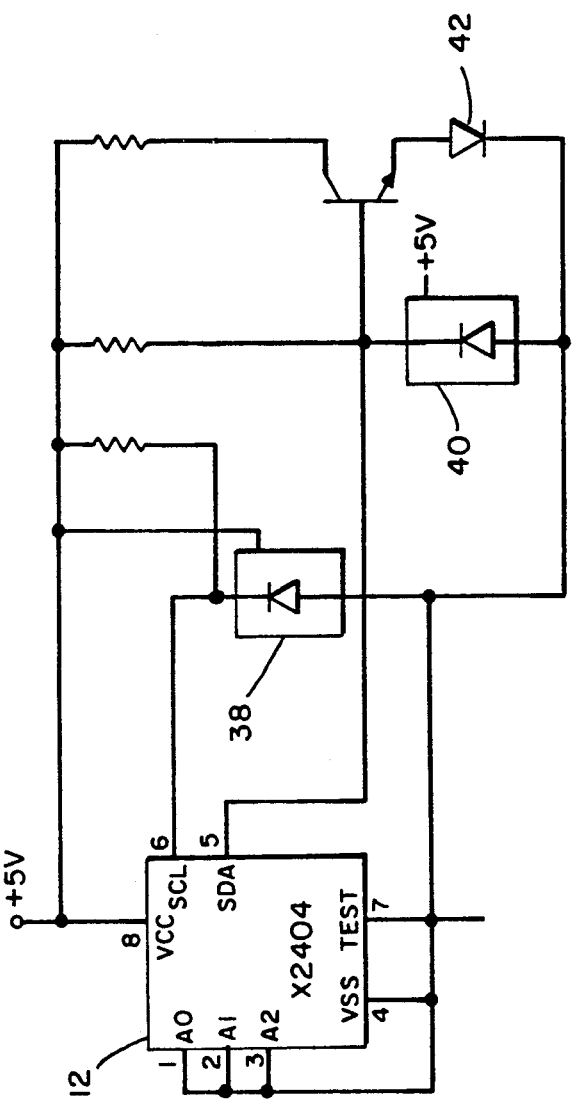
FIG. 4 is an electrical schematic of the memory and optical circuits of the data storage card of the present invention.

Turning now to FIG. 4, the memory 12 and optical communications circuitry 24 are shown in greater detail. The memory 12 is a Model X2404 Electrical Erasable PROM manufactured by Xicor Incorporated of Milpitas, Calif. The X2404 holds 4 kilobits, internally organized as two 256×8 pages. The X2404 further includes a serial communications processor within the chip, providing a bidirectional data transfer protocol and eliminating the need for any external memory addressing and control logic.

All data transfers are under the control of reader/programmer unit 14. The internal serial communications processor accepts read and write commands in the form of eight bit words, which originate from the microprocessor 28 in the reader/programmer unit 14. Single data requests can initiate the transfer of entire blocks of data, serially, through bidirectional pin SDA.

The infrared optical communications circuitry consists of IR photodiodes 38 and 40, and IR LED 42, which form an optical communications link with complimentary and spectrally matched IR devices at the input to the microprocessor 28 in the reader/programmer unit 14.

The photodiodes 38 and 40 are Model OPL-500 series plastic sensors manufactured by TRW Optron of Carrollton, Tex. The photodiode 38 receives the clock from the microprocessor 28 in the reader/programmer unit 14 and inputs this signal to pin SCL of memory 12. The photodiode 40 receives data and read/write commands from the microprocessor 28 and inputs them to bidirectional pin SDA.

Data output on pin SDA is transmitted to the microprocessor 28 in the reader/programmer unit 14 by means of the infrared LED 42, which is a series OP140 GaAs Plastic Infrared Emitting Diode, spectrally matched to the OPL-500 sensors, and also manufactured by TRW Optron of Carrollton, Tex.

Figure 5:
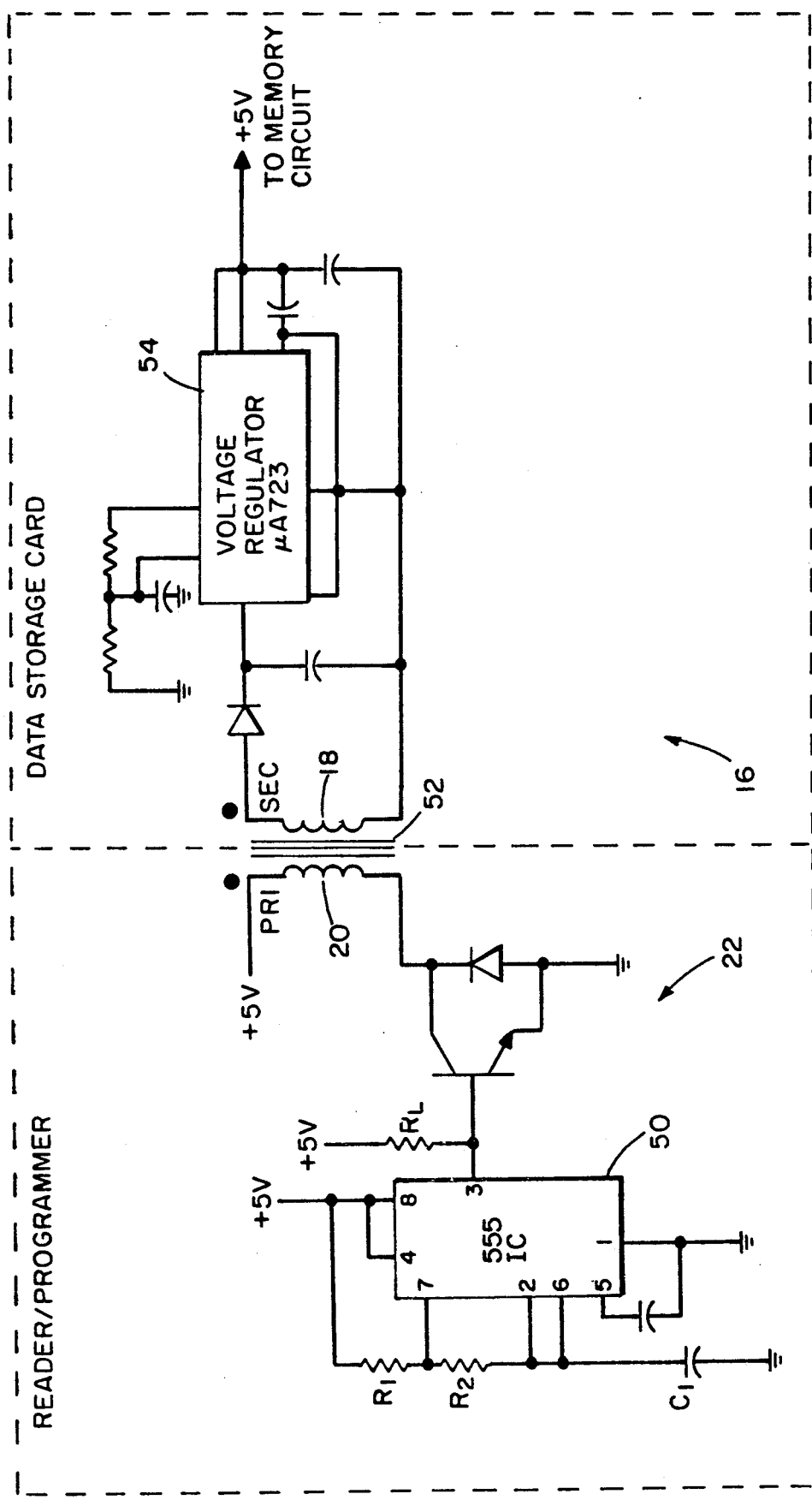
FIG. 5 is an electrical schematic of the inductive power circuitry of the present invention.

Turning now to FIG. 5, a more detailed view of the power circuitry is shown. The high-frequency oscillator 22, located in the reader/programmer 14, utilizes a common 555 timer IC 50 with resistors and capacitor values chosen to yield an output frequency of 10 kilohertz, which is within the standard range of switching power supplies. A high-frequency oscillator is desirable in order to minimize the capacitance needed in filtering. The output of the oscillator 22 is magnetically coupled through primary coil 20 to secondary coil 18 on the data storage card 10, inducing a current. In FIG. 5, the single magnetic core 52 represents the combined function of two core elements associated with the primary and secondary coils, which are actually separated by an air gap, as will be described.

The power supply circuit 16 on the data storage card 10 consists of a standard diode-capacitor half-wave rectifier and a voltage regulator 54. The voltage regulator 54 is a surface-mounted Model uA723 IC made by Texas Instruments, Incorporated of Dallas, Tex., with resistor and capacitor values chosen to yield a regulated output of 5 volts. The output of the voltage regulator 54 is supplied to the memory 12 and the infrared optoelectronic devices 24.

FIG. 6 shows the relationship between the various magnetic elements which cooperate to effect the transfer of electric power from the reader/programmer 14 to the data storage card 10. The magnetic core 52, located behind panel 58 of the reader/programmer 14, is a standard EC core made of 3C8 Ferrite, manufactured by Ferroxcube Corporation of Saugerties, N.Y. The magnetic core 52 is wound with sixty turns of 36 AWG wire (indicated by the reference numeral 60).

The secondary coil 18 in the data storage card 10 is etched into the copper of the printed circuit board 36, in the shape of a spiral, and bonded between layers 62 and 64 of Kapton. The secondary coil 18 is the equivalent of 70 windings of round 36 AWG wire. The 36 AWG wire has a cross sectional area of 0.0000196 square inches. Covering the area behind primary coil 18, there is a flux carrier 46, which acts to close the magnetic circuit that is created when primary coil 20 becomes energized. The flux carrier 46 is also made of 3C8 Ferrite, with a thickness of approximately 0.095 inches.

There is a air gap in the magnetic circuit, as indicated in FIG. 6, between the forward edge of the magnetic core 52 and the facing edge of the flux carrier 46. It is desirable for this gap to be 0.010 inches or less. The 3C8 Ferrite, used for both the magnetic core 52 and the flux carrier 46, has an inductance of 75 millihenries per 1000 turns of 36 AGW wire for this air gap range.

When the primary coil 20 is energized by the 10 kilohertz oscillator 22, magnetic flux is created in magnetic core 52 and travels across the air gap, through the flux carrier 46, and back to the opposite leg of the magnetic core 52. As the rising and falling magnetic flux crosses the conductors of secondary coil 18, an electric current is induced therein.

Referring now to FIG. 7, the reader/programmer 14 is illustrated in more detail. The reader/programmer 14 is preferably a small, lightweight, simplified device, which could be mounted unobtrusively in various fixed locations, depending on the specific application of the data storage card 10. In an access control system to a building, the reader/programmer 14 might conveniently be mounted beside a door. As a computer security device, the reader/programmer 14 could be mounted on a computer console. The size and shape of the reader/programmer 14 also depends somewhat on the specific application. It is even possible for the reader/programmer 14 to be incorporated into the control panel of a larger device, such as a bank teller machine or a computer keyboard. FIG. 7 shows the reader/programmer 14 as a free-standing table-top unit.

The reader/programmer 14 includes a housing 66 to contain its internal electronics and provide a means for inserting the data storage card 10 therein. The housing includes a flat panel 58. The primary coil 20 and the infrared optoelectronic devices 26 are mounted behind the panel 58 in the proper orientation for interfacing with the data storage card 10.

Data storage card 10 slides down into slots 70, which provide for proper mechanical alignment of the card 10 by holding it flat against the panel 58, preventing it from moving side to side, and properly orienting its magnetic and optoelectronic devices with those of the reader/programmer 14.

The reader/programmer 14 may be used with a keyboard entry device 72. The keyboard entry device 72 includes a keyboard 74 for the entry of personal identification or verification codes by a user. A display 76 is included to provide feedback to a user or to display instructional information. For displaying data retrieved from the data storage card 10, the keyboard entry device 72 may include an alphanumeric keyboard and a video display. The exact form of the keyboard entry device 72 is somewhat dependent on the particular application of data storage card 10.

Figure 8:
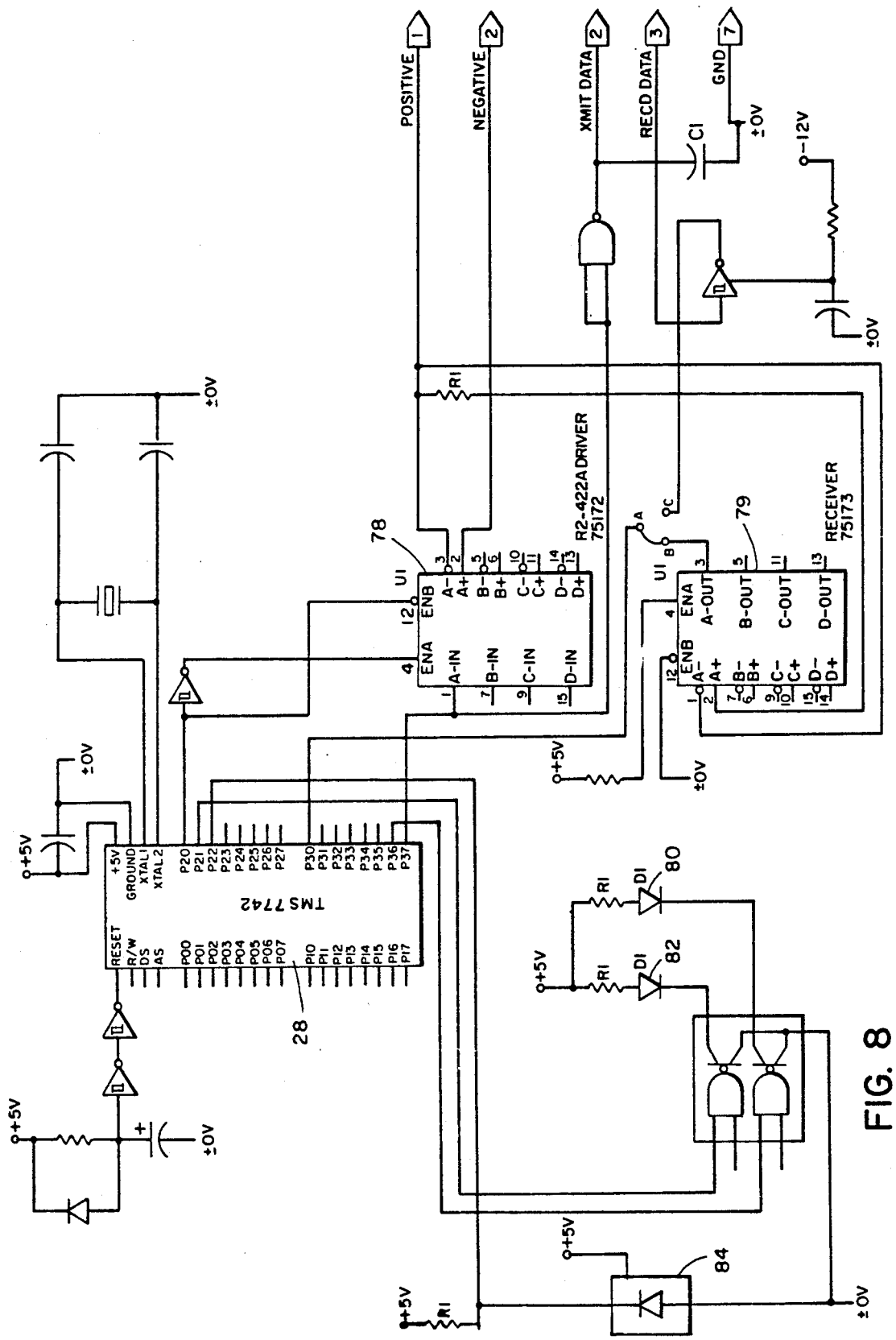
FIG. 8 is an electrical schematic of the reader/programmer of the present invention.

Referring now to FIG. 8, a schematic is illustrated, showing the microprocessor and communications circuitry of reader/programmer 14. As discussed in connection with FIG. 1, the reader/programmer 14 includes a microprocessor 28, infrared optoelectronic devices 26, and an industry standard RS-232 interface 30.

The microprocessor 28 is a Model TMS7742, manufactured by Texas Instruments, Incorporated of Dallas, Tex. The TMS7742 is actually an eight-bit microcontroller chip, containing internal PROM memory. Alternatively, a Model Z8613 may be used, manufactured by Zilog, Incorporated of Campbell, Calif.

The infrared optoelectronic devices 26 consist of two infrared LEDs 80 and 82, spectrally matched to the photodiodes 38 and 40 on data storage card 10. Infrared LED 80 supplies the clock to the card 10, and infrared LED 82 is for transmitting data. Optoelectronic devices 26 also include an infrared photodiode 84 which is matched to the infrared LED 42 on the card 10. Infrared photodiode 84 is for receiving data from the card 10.

The microprocessor 28 communicates with an external RS-232 device, such as a host computer by means of an interface driver 78 and an interface receiver 79. The interface driver 78 and the interface receiver 79 operate on protocol supplied by the microprocessor 28. This allows the reader/programmer 14 to be connected to a variety of host computers, depending upon the particular application. The host system will provide the particular applications software for the reader/programmer's function. In the case of security applications, all encryption and decryption of data is performed in the host computer.

For example, the host computer could command the microprocessor 28 to activate the infrared optoelectronic devices 26 to request data from the card memory 12 and transmit that data to the host computer. The microprocessor 28 turns the infrared LED 80 on and off at a specified clock frequency to provide the clock to the card memory 12. The microprocessor 28 sends out a data request command to the card memory 12 by means of infrared LED 82, and then monitors infrared photodiode 84 for the data being received. When received, the data is sent out to a host computer by means of the interface driver 78.

To use the data storage card 10 in a security access application, for example, the user would approach the security station and insert the card into the reader/programmer unit 14. The microprocessor 28 would be constantly issuing polling signals to detect the presence of a card. Upon receiving a response from the user's card, the reader/programmer 14 reads a specified memory location of the memory 12, for a code. The code references a table of personal identification numbers contained in PROM memory, in microprocessor 28. The microprocessor looks up the user's personal identification code and requests that the user enter his personal identification code through the keyboard entry device 72. The microprocessor 28 then compares the personal identification code with the one entered by the user. If the codes match, the user is given access; if they don't match, access is denied.

In the application described hereabove, the user's personal identification code is known only to the user and is contained only in a look-up table residing in the reader/programmer 14. Should an unauthorized person gain access to the data in the card, the user's personal identification code would not be revealed, since the card contains only a pointer to look-up table. If access is granted by the reader/programmer 14, additional data could be accessed from the card—financial or medical records, for example.

In view of the above, it will be seen that the several objects of the present invention are readily achieved and other advantageous results attained.

Obviously many modifications and variations of the present invention are possible in light of the above teachings, without departing from the spirit and scope of the invention. For example, the principles of the present invention could include additional memory devices to increase the data storage capacity of the card, or additional logic circuity could be employed to provide more sophisticated data encoding and security schemes. In addition, the present invention need not take the form of a flat card, as it is conceivable that data storage devices having different shapes and sizes may employ the principles of this invention. In view of this, it is understood that the above description is illustrative rather than limiting.

What is claimed is:

1. A secure portable data storage device for use with an external data reading apparatus, comprising
   a sealed case;
   memory means, within the sealed case, for storing data, the memory means including an internal serial communications processor providing a bidirectional data transfer protocol for facilitating the output of data from the memory means in response to a clock signal and read command received from an external data reading apparatus;

infrared optoelectronic means for exchanging infrared optical signals between the data storage device and the data reading apparatus consisting of first light receiving means for receiving light pulses representing clock pulses and providing the clock signals therefrom;

second light receiving means for receiving light pulses representing read commands and providing the read commands therefrom;

light providing means for receiving the output data from the memory means and producing light pulses representing the output data;

the infrared optoelectronic means predeterminately disposed within the sealed case for precise alignment with complementary infrared optoelectronic means in the external data reading apparatus; and the sealed case being transmissive to infrared light but opaque to visible light so that the predetermined disposition of the optoelectronic means within the sealed case is obscured from visual inspection, to provide enhanced security.

2. A secure portable data storage device as recited in claim 1 further comprising:

a secondary inductive coil predeterminately disposed within the case for precise alignment with a complementary primary coil in the external data reading apparatus, so that, upon energizing the primary coil, a current is induced in the secondary coil for providing operating power to the data storage device;

wherein the predetermined disposition of the primary coil within the sealed case is obscured from visual inspection and the portable data storage device is operational only when the secondary coil is precisely aligned with the complementary primary coil.

3. A secure portable data storage device as recited in claim 1 wherein:

the bidirectional protocol further facilitates the input of data into the memory means in response to a clock signal and write command; and the second light receiving means further receives light pulses representing write commands and data therefrom to the memory means.

4. Data reading apparatus for reading data stored in a portable data storage device which includes a sealed case; memory means for the storage of data, said memory means including an internal serial communications processor providing a bidirectional data transfer protocol for facilitating the output of data from the memory means in response to a clock signal and read command received from an external data reading apparatus; infrared optoelectronic means for exchanging infrared optical signal between the data storage device and the data reading apparatus consisting of first light receiving means for receiving light pulses representing clock pulses and providing the clock signals therefrom; second light receiving means for receiving light pulses representing read commands and providing the read commands therfrom; light providing means for receiving the output data from the memory means and producing light pulses representing the output data; the infrared optoelectronic means predeterminately disposed within the sealed case for precise alignment with complementary infrared optoelectronic means in the external data reading apparatus; and the sealed case being transmissive to infrared light but opaque to visible light so that the predetermined disposition of the optoelectronic means within the sealed case is obscured from visual inspection, to provide enhanced security;

the data reading apparatus comprising:

alignment means for aligning the portable data storage device and the optoelectronic means contained therein in a predetermined disposition relative to complementary optoelectronic means contained in said reading apparatus;

clock providing means for providing light pulses representing clock signal to the first light receiving means when the portable data storage device is aligned in the predetermined disposition;

second light providing means for providing the light pulses representing the read commands to the second light receiving means when the portable data storage device is aligned in the predetermined disposition;

third light receiving means for receiving the light pulses representing the output data when the portable data storage device is aligned in the predetermined disposition, and for converting the received light pulses into digital data; and controlling means for providing the clock signal and read commands, and for interpreting the digital output data produced by the portable data storage device.

5. Data reading apparatus as recited in claim 4 further comprising:

a primary inductive coil predeterminately disposed within the data reading apparatus for precise alignment with a complementary secondary coil in the portable data storage device, so that, upon energizing the primary coil, a current is induced in the secondary coil for providing operating power to the data storage device;

wherein the predetermined disposition of the secondary coil within the sealed case is obscured from visual inspection and the portable data storage device is operational only when the secondary coil is precisely aligned with the complementary primary coil.

6. Data reading apparatus as recited in claim 4, wherein:

the bidirectional protocol further facilitates the input of data into the memory means in response to a clock signal and write command; and the controlling means further provides data to be stored in the memory means and write commands for controlling the storing of said data; and the second light providing means receives the data and write commands and produces light pulses representing the data and write commands therefrom.

* * * * *